United States Patent [19]
Choi et al.

[11] Patent Number: 5,724,202
[45] Date of Patent: Mar. 3, 1998

[54] MODE RESET METHOD AND APPARATUS FOR A MAGNETIC RECORDING/REPRODUCING APPARATUS

[75] Inventors: Do Y. Choi; Gun C. Park; Jae K. Seo, all of Suwon, Japan

[73] Assignee: Samsung Electronics Co., Ltd., Kyungki-do, Rep. of Korea

[21] Appl. No.: 298,744

[22] Filed: Aug. 31, 1994

[30] Foreign Application Priority Data

Aug. 31, 1993 [KR] Rep. of Korea .................. 93-17571

[51] Int. Cl.⁶ ...................... G11B 15/18; G11B 15/48
[52] U.S. Cl. .................. 360/71; 360/69; 360/74.1
[58] Field of Search .................. 360/74.1, 69, 71, 360/85, 137

[56] References Cited

U.S. PATENT DOCUMENTS

| 4,903,149 | 2/1990 | Hasegawa et al. | 360/69 |
| 5,313,344 | 5/1994 | Sakaguchi et al. | 360/74.1 X |

FOREIGN PATENT DOCUMENTS

| 5718040 | 1/1982 | Japan | 360/71 |
| WO9321631 | 10/1993 | WIPO . | |

*Primary Examiner*—Aristolelis M. Psitos
*Assistant Examiner*—Regina Y. Neal
*Attorney, Agent, or Firm*—Sughrue, Mion, Zinn, Macpeak & Seas, PLLC

[57] ABSTRACT

A mode reset method for a magnetic recording/reproducing apparatus whereby a deck is preferably reset to a predetermined mode of operation when power is applied. The method includes an initializing step and a mode reset step. Preferably, the initializing step includes substeps for driving a plunger, rotating a capstan motor to connect a transmission gear to a loading system when the power is applied, and then retracting the plunger. The mode reset step includes substeps for resetting the deck to a stop mode when the deck is in the stop mode, when the deck is between the stop mode and a playback mode, or when the deck is between the stop mode and an unloading stop mode at the time power is applied. Alternatively, the mode reset step resets the deck to the unloading stop mode, when the deck is stopped between the unloading stop mode and eject mode. During the mode reset step, operation is controlling responsive to frequency generator signals during rotation of the capstan motor, and the outputs from stop and a cassette-in sensors. The mode reset method advantageously enables the deck to recognize its own mode of operation and to prevent malfunction thereof when the power is applied. An apparatus adapted to performing the method is also described.

12 Claims, 3 Drawing Sheets

MODE RESET METHOD AND APPARATUS FOR A MAGNETIC RECORDING/ REPRODUCING APPARATUS

BACKGROUND OF THE INVENTION

1. Field of the Invention

The present invention is related to a mode reset method for a magnetic recording/reproducing apparatus and, more particularly, to a mode reset method for a magnetic recording/reproducing apparatus for automatically resetting a deck to a predetermined mode state when power is supplied to the magnetic recording/reproducing apparatus. A corresponding apparatus is also disclosed.

The present application is based on Korean Patent Application No. 9317571, which is incorporated herein by reference for all purposes.

2. Description of Related Art

A magnetic recording/reproducing apparatus such as video tape recorder is generally known and some version of this apparatus has been developed and marketed by the leading companies in the home electronics field. This apparatus has become so wide spread, e.g., found in almost every home, that it is classified as a staple commodity for a modern family.

In recent years, articles such as portable camcorders have been developed which employ the above-mentioned magnetic recording/reproducing apparatus. Consumer acceptance is driven by consumer convenience. Consumers generally find the smallest, lightest camcorder to be most desirable.

It will be noted that one factor that greatly influences the size and weight of the camcorder package is the deck size of the recording/reproducing apparatus. Since the smallest, lightest deck is often identified by a ratio relating deck size to tape size, this ratio can act as an indicator regarding the technical advancement of the manufacturer.

As a result of the research and development into reducing deck size, the inventors of the present invention have already developed and proposed a magnetic recording/reproducing apparatus, which is the subject of Korean Patent Application No. 93-5016. In that reference, a chassis is disclosed which is separated into an upper chassis having a rotary drum and a lower chassis having respective travelling elements. It should be noted that the respective travelling elements, which are arranged within an internal space of a tape cassette, perform a first loading of a magnetic tape within the tape cassette onto the rotary drum and, subsequently, a secondary, full-loading operation with respect to the tape when the upper chassis vertically descends for seating on the lower chassis. Thus, the chassis size is greatly reduced. In addition, the loading and movement of the magnetic tape can be easily carried out by a single driving source. In addition, the respective modes of operation can be controlled without requiring additional elements, thus resulting in a reduced number of components making up the deck.

One of the drawbacks with this apparatus quickly becomes evident if power fails or is suddenly turned off. In that case, the deck is not always in one of the predetermined mode states defined for the magnetic recording/reproducing apparatus according to the above-mentioned application. Therefore, when the magnetic recording/reproducing apparatus is turned on and an operation key is supplied thereto, it cannot be determined where an associated ring gear of the magnetic recording/reproducing apparatus is positioned, which, in turn, prevents the deck from recognizing the current operating mode. When this happens, a malfunction normally occurs.

U.S. Pat. No. 5,061,848 entitled: "NON-CONTACTING ROTARY TYPE MODE SWITCH FOR MAGNETIC TAPE RECORDING DEVICE" discloses a technique whereby a non-contacting rotary type mode switch formed from a plurality of reflection plates and a plurality of optical reflection sensors is employed to discriminate the mode of the deck. More specifically, U.S. Pat. No. 5,061,848 discloses that a plurality of reflection plates are respectively formed on a plurality of concentric circles on the rear surface of a mode switch gear, and the plurality of optical reflection sensors for reading out a rotation mode of a cam gear are installed on the upper surface of the body of the switch. The optical reflection sensor is formed from a light-emitting device for emitting light and a light-receiving device for detecting light reflected from the corresponding reflection plate. Accordingly, the reflection plate of the mode switch gear reflects the light from the light emitting device corresponding to the rotational position of the cam gear, and the reflected light is incident to the light receiver of the optical reflection sensor. It should be noted that the rotational positions of the mode switch gear and cam gear can be used to read out the mode of the deck in accordance with the detection of whether the reflection plate exists or not in the light receiver. Therefore, the effects of mechanical abrasion, deformation, the leakage of lubricating oil, and electrical discharge can be eliminated while minimizing the system size.

In the above technique, however, even though the mode of the deck is determined in accordance with the rotational position of the cam gear, the mode switch cannot be utilized in discriminating the mode of operation and, thus, is unable to solve the problem associated with the conventional deck.

SUMMARY OF THE INVENTION

The principal object of the present invention is to solve the above-described problems associated with the prior art devices.

Accordingly, an object of the present invention is to provide a mode reset method for a magnetic recording/ reproducing apparatus, wherein frequency generator signals generated during rotation of a capstan motor are utilized to permit automatic and obligatory reset of the deck to a predetermined mode when power is turned on, regardless of the mode of operation of the deck at the time the power is turned off.

These and other objects, features and advantages according to the present invention are provided by a mode discriminating method for a magnetic recording/reproducing apparatus for executing mode discrimination responsive to output signals from a stop sensor and a cassette-in sensor. The mode reset method for the magnetic recording/ reproducing apparatus advantageously includes:

an initializing step for driving a plunger while rotating a capstan motor to connect a transmission gear to a loading system when power is supplied, and subsequently turning off the plunger; and a mode reset step for determining a current position of a ring gear responsive to respective outputs from a stop sensor, a cassette-in sensor and frequency generator signals generated by rotation of the capstan motor, and resetting the deck to a predetermined operating mode.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1:
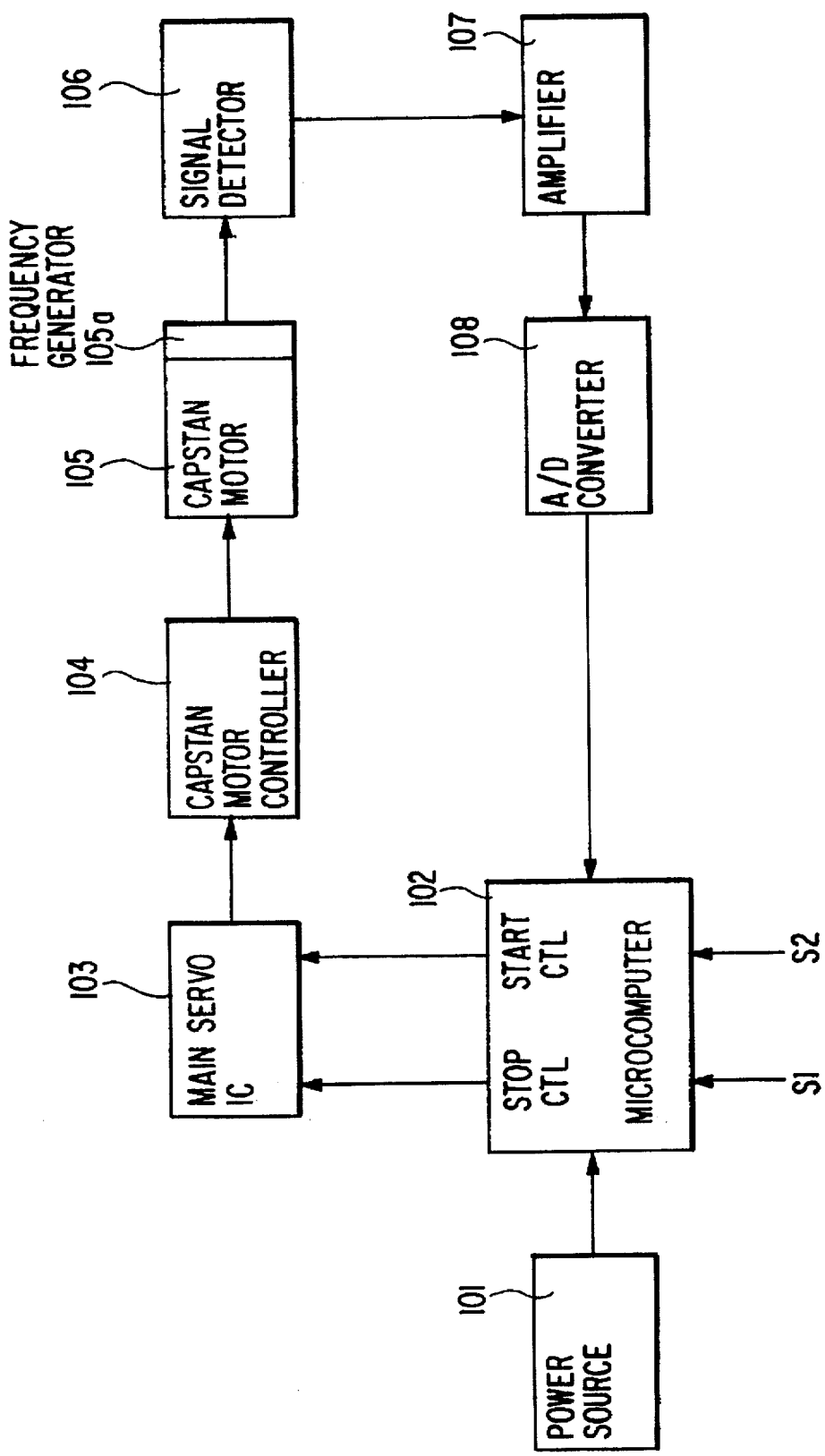
FIG. 1 is a high level block diagram illustrating circuitry which is useful performing a mode reset method for a magnetic recording/reproducing apparatus according to the present invention.

In FIG. 1, a power source 101 for turning on/off power of a magnetic recording/reproducing apparatus is connected to a microcomputer 102 for controlling the driving of a capstan motor 105 when power is turned on to return the deck to a predetermined mode state. The output terminal of the microcomputer 102 is connected to a main servo integrated circuit (IC) 103 for rotating the capstan motor 105 clockwise or counter-clockwise in accordance with a start control signal START CTL or stop control signal STOP CTL generated by the microcomputer 102.

The output terminal of the main servo IC 103 is connected to a capstan motor controller 104 for rotating the capstan motor 105 clockwise or counter-clockwise or for stopping the rotation of the capstan motor 105 in accordance with an output signal from the main servo IC 103.

Preferably, the capstan motor 105, which includes a frequency generator (hereinafter referred to as "FG") 105a, is connected to an FG signal detector 106 for detecting the frequency of an FG signal output in response to rotation of capstan motor 105. The output terminal of the FG signal detector 106 is connected to an amplifier 107 for amplifying the detected FG signal to a predetermined level. The output terminal of the amplifier 107 is connected to an analog-to-digital (A/D) converter 108 for converting an analog FG signal into a digital FG signal. The output terminal of A/D converter 108 is preferably connected to the microcomputer 102.

The microcomputer 102 is supplied with outputs of a stop sensor S1 and a cassette-in sensor S2. In an exemplary case, the stop and cassette-in sensors S1, S2 are provided by the structure disclosed in commonly assigned PCT Application No. WO93/21631, designating the United States, which claims priority from Korean Patent Application No. 93-5016. PCT Application No. WO93/21631 is incorporated herein by reference for all purposes. It will be noted that, according to the present invention, conventional video tape recorders which include a dedicated loading motor or a mode switch are not the type of video tape recorders to which the inventive method is applicable. The inventive mode control method for a magnetic recording/reproducing apparatus is based on the mechanical elements disclosed in PCT Application No. WO93/21631, where the "loading system" as shown in FIG. 3 is controlled, not by the loading motor, but by the capstan motor, and where the mode is controlled, not by an included mode switch, but by the frequency generator FG of the capstan motor in cooperation with the stop sensor and the cassette-in sensor.

Figure 3:
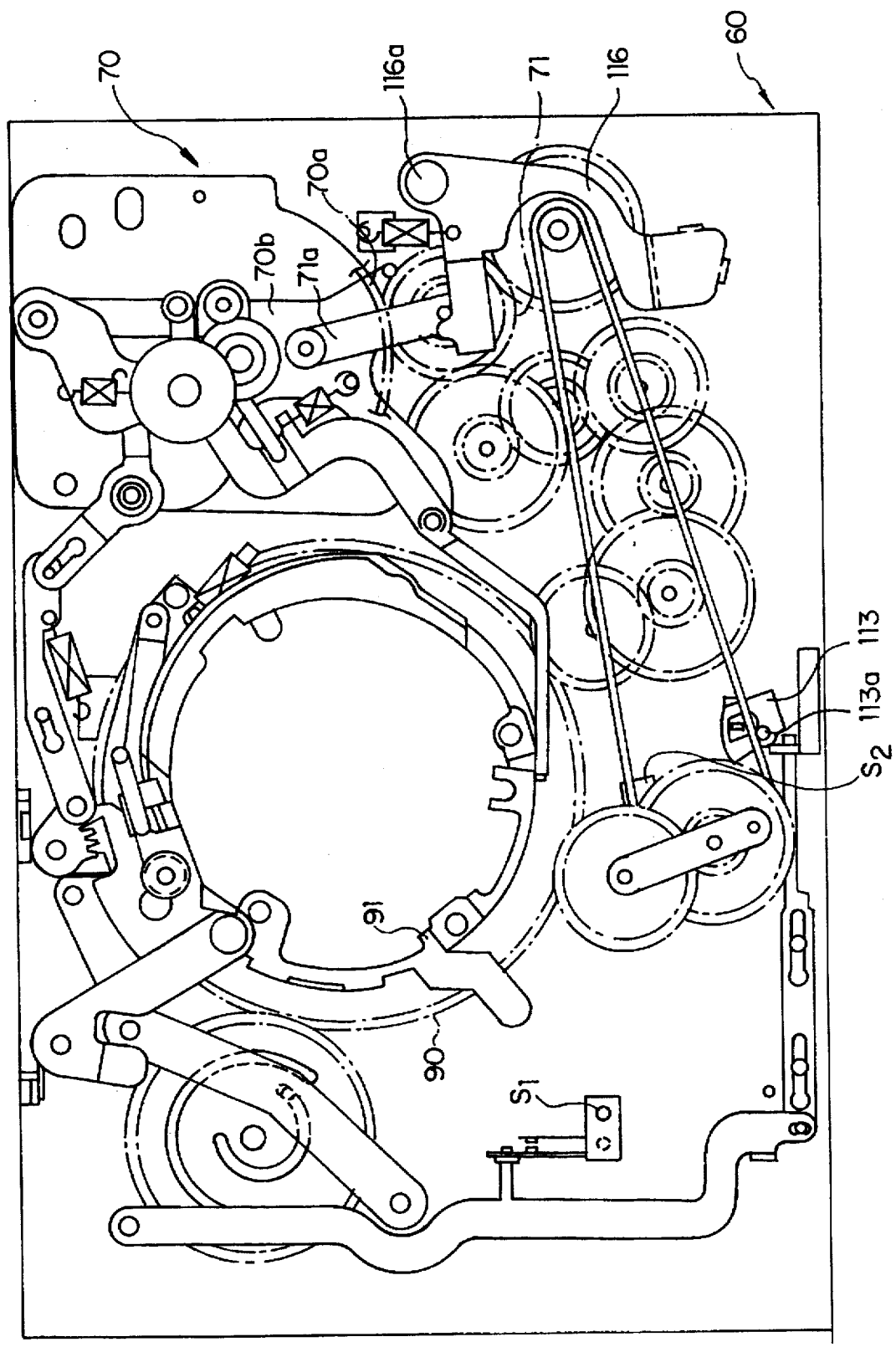
FIG. 3 illustrates a diagram of a magnetic tape loading system and running system.

FIG. 3 illustrates an example of a magnetic tape loading system and running system. The system includes a capstan motor 70 installed on one side of a lower chassis 60. The capstan motor 70 can rotate in either the forward or reverse directions in response to a mode control signal. A gear 70a of capstan motor 70 meshes with a power transmitting gear 71, which is connected by a bracket 70b and a lever 71a, in that order. Preferably gear 70a is free to rotate in either direction around a shaft in response to the rotational direction of capstan motor 70, thereby selectively transmitting the rotational force from the capstan motor 70 to either a magnetic tape loading system or a running system.

The loading system and running system also include a ring gear 90. The ring gear 90, which transmits the rotational force of capstan motor 70 via the magnetic tape loading system, cooperates with a guide member 91 installed on lower chassis 60 to permit the rotation of the ring gear 90.

As shown in FIG. 3, the position of transmitting gear 71, which selectively transmits the rotational force of capstan motor 70 to the magnetic tape loading system and running system, advantageously can be regulated by a position controlling device installed at the lower right side of lower chassis 60. A driving coil (not shown) is attached to the upper surface of lower chassis 60 and connected to a circuit pattern (not shown). Above the driving coil, there is installed a plunger 116 on which a permanent magnet is attached with a predetermined spacing with respect to a driving coil. Preferably, the plunger 116 is installed so as to be rotated by a spring member about a shaft located on one end of the plunger 116 while a holding piece is formed on one end of an arm member, e.g., extending from one side of plunger 116, and the holding piece is maintained and held on a shaft of the transmitting gear 71 so as to forcibly regulate the position of the transmitting gear 71.

A stop sensor S1 used to indicate the stop mode of operation is also illustrated in FIG. 3. It will be noted that a locking member operates a rotating member 113, which is rotated around shaft 113a parallel to the lower chassis 60, permitting sensor S2, which senses the presence or absence of a cassette, to be operated by the rotating member 113.

Advantageously, the stop sensor S1 provides a high level signal only at a position corresponding to a stop mode of operation, while the cassette-in sensor provides signals in such a manner that a high or low level signal is supplied in a position associated with an unloading stop mode, a high level signal is constantly supplied during a stop or playback mode, and a low level signal is constantly supplied in an eject mode, as shown in the Table below.

|  | EJECT MODE | UNLOADING STOP MODE | STOP MODE | PLAYBACK MODE |
|---|---|---|---|---|
| STOP SENSOR S1 | ——— | ——— | ⎺⎽ | ——— |
| CASSETTE-IN SENSOR S2 | ——— | ⎽⎺ | ——— | ——— |

Figure 2:
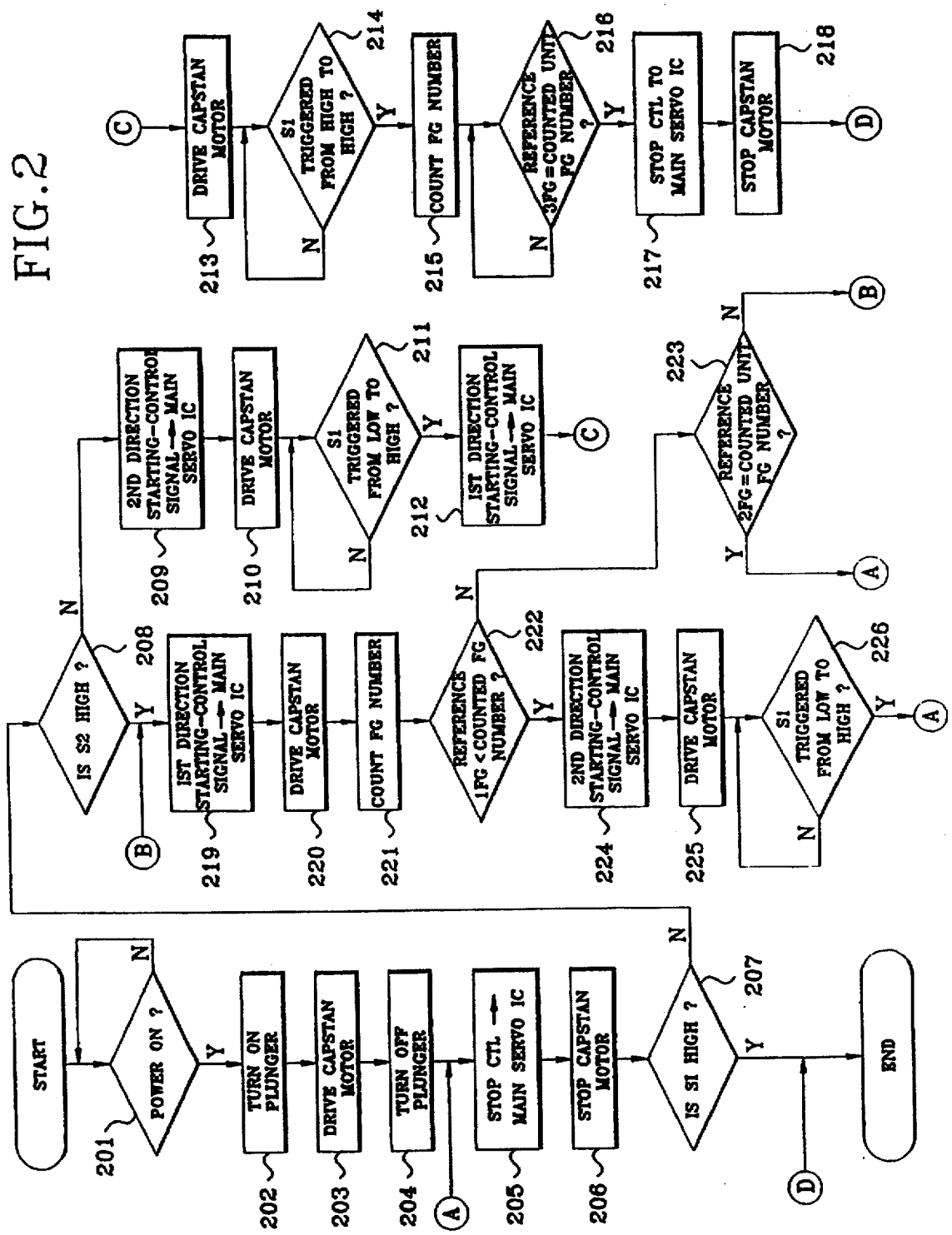
FIG. 2 is a flowchart for illustrating the mode reset method of the magnetic recording/reproducing apparatus according to the present invention.

FIG. 2 is a flowchart showing one embodiment of the mode reset method of the magnetic recording/reproducing apparatus according to the present invention, which advantageously can be programmed in the microcomputer 102.

In the present invention constructed as described above, when power is suddenly turned off, the deck may stay in the stop mode, between the unloading mode and eject mode, between the stop mode and playback mode, between the stop mode and unloading stop mode, etc.

In the discussion which follows, the clockwise direction is defined as a first direction, and the counter-clockwise is as a second direction. It will be appreciated that this direction is arbitrary, e.g., the direction is ultimately determined by the number of gears in the deck transmitting rotational force. That is, the counter-clockwise direction could be the first direction, while the clockwise direction could be the second direction.

Each of the cases resulting from turning power on and off will now be described in detail to illustrate the method according to the present invention.

i) At Stop Mode

When a signal indicating that the power is turned on is supplied from the power source 101 at step 201, the microcomputer 102 operates a plunger to transmit the rotational force of the capstan motor 105 to the magnetic tape travelling system, so that a transmission gear is connected to the loading system to release a position control of the transmission gear during step 202(see FIG. 3). Then, a start control signal START CTL is supplied to the main servo IC 103 to drive the capstan motor 105 (step 203). Advantageously, the driving power of the capstan motor 105 is connected to the loading system, and the plunger is retracted to control the position of the transmission gear at step 204. Thereafter, the stop control signal STOP CTL is supplied to the main servo IC 103 during step 205, to thereby stop the capstan motor 105 during step 206.

The microcomputer 102 then advantageously determines whether the output of the stop sensor S1 is high or not during step 207. Since the high output of the stop sensor S1 denotes that the power was turned off when the deck was in the stop mode, all mode reset functions of the deck are stopped.

Preferably, in the event that the output of the stop sensor S1 is not high, microcomputer 102 determines the status of the cassette-in sensor S2 during step 208.

ii) Between Unloading Stop and Eject Modes

When the output of the cassette-in sensor S2 is determined to be low in step 208, it denotes that the deck is in the status between the unloading stop mode and eject mode. Therefore, the mode is set to the stop mode and then reset to the unloading stop mode.

Advantageously, microcomputer 102 provides a second direction starting-control signal to the main servo IC 103 at step 209, which rotates the capstan motor 105 in the second direction during step 210 until the output of the stop sensor S1 is triggered from low to high, as indicated in step 211. In step 211, when the output of the stop sensor S1 is triggered from the low to high, i.e., when the deck is in the stop mode state, the microcomputer 102 supplies a first direction starting-control signal to the main servo IC 103 during step 212, so that the capstan motor 105 is rotated in the first direction at step 213 until the output of the stop sensor S1 is triggered from high to low during step 214.

In step 214, if the output of the stop sensor S1 is triggered from the high to low, the FG signal generated by the FG signal generator 105a in the capstan motor 105 is detected in the FG signal detector 106 and amplified in the amplifier 107. Then, the amplified FG signal is converted into the digital FG signal in the A/D converter 108, so that the number of the FG signals advantageously can be counted during performance of step 215.

The number of the FG signals corresponding to an angle between the stop mode to the unloading stop mode is set to a reference number of 3 FG. Preferably, the number of FG signals counted in step 215 is compared with the reference number 3 FG during step 216.

Preferably, the capstan motor 105 is continuously rotated in the first direction until the number of the FG signals produced by rotation of the capstan motor 105 is equal to reference 3 FG. In this circumstance, since the deck is in the loading stop mode state, the stop control signal STOP CTL is supplied to the main servo IC 103 during step 217 to stop the rotation of the capstan motor 105, thereby stopping the mode reset function of the deck during step 218.

Therefore, the magnetic recording/reproducing apparatus achieves the unloading stop mode state and waits for additional control signals.

On the other hand, if the output of the cassette-in sensor S2 is determined as high in step 208, the deck is in between the eject mode and playback mode status. Here, the interval between the eject mode and the playback mode is so wide that the current mode is searched after dividing the controlling range into the playback mode & stop mode section and stop mode & eject mode section, using the stop mode as a reference.

iii) Between Playback and Stop Modes

When the output of the cassette-in sensor S2 is determined to be high in step 208, the microcomputer 102 supplies the first direction starting-control signal to the main servo IC 103 at step 219 to rotate the capstan motor 105 in the first direction during step 220.

The FG signals generated in response to rotation of the capstan motor 105 in the first direction are detected in the FG signal detector 106, and amplified in the amplifier 107. After this, the amplified FG signals are converted into the digital FG signals in A/D converter 108, and then counted during step 221.

Preferably, the number of FG signals corresponding to an angle from the playback mode to the stop mode is set as the reference number 1 FG, and the number of FG signals counted in step 221 is compared with the number 1 FG at step 222. It should be noted that the number of FG signals corresponding to a predetermined angle of the capstan motor 105 can be set as the reference number 2 FG. Advantageously, this predetermined angle of the capstan motor 105 may be set to 1°, 0.1° or 0.2°. The reference number 2 FG preferably can be set in an optimal value during programming.

Preferably, the compared number of FG signals is the number of unit FG, wherein, if the number of reference 2 FG is set to 1°, the number of the counted FG signals are set to be counted again when the number of the counted FG signals becomes 1°. Similarly, the number of the counted FG signals is reset to be counted again for each 0.1° when a setting of 0.1° is established or for each 0.2° when a setting to 0.2° is established.

Preferably, the number of FG signals compared with the reference number 1 FG is the number of continuously accumulated FG signals. The number of FG signals compared with the number of 2 FG is the number of FG unit signals, which are reset and counted again after the number of FG signals counted are equal to the number of FG signals set as the reference number 2 FG.

It will be appreciated that, because the section between the playback mode and stop mode is theoretically represented by a predetermined angle, the capstan motor 105 must be prevented from being rotated beyond that theoretical angle.

If the output of the stop sensor S1 is high within the theoretical angle, the mode reset function of the deck is stopped at that moment, and the stop mode state is maintained to wait for the following operation.

Accordingly, when it is determined that the number of FG signals counted while the capstan motor 105 is rotated in the first direction in step 222 is less than or equal to the reference number 1 FG, it is determined whether or not the number of unit FG counted in step 223 is the same as the reference 2 FG.

In step 223, if it is determined that the reference number 2 FG is the same as the number of FG units, the stop control signal STOP CTL is supplied to the main servo IC 103 at step 205 to stop the capstan motor 105 during step 206. Then, the output of the stop sensor S1 is examined to determine whether it is in high state or not at step 207.

When the high state is output by stop sensor S1, the deck is currently in the stop mode, so that the mode reset function of the deck is stopped at that moment to maintain the stop mode state and wait for a follow-up operation. In the event that the output of stop sensor S1 is low, denoting that the capstan motor 105 is not rotated to the position corresponding to the stop mode, the output of the cassette-in sensor S2 is examined to determine whether it is high or not during step 208.

When the output of the cassette-in sensor S2 is high, the number of FG signals counted while continuously rotating the capstan motor 105 in the first direction is compared with the reference number 1 FG. If it is again determined that the number of the counted FG signals is smaller than or equal to the reference number 1 FG, the number of FG units is compared with the reference number 2 FG. When these values are equal, the step of determining whether the output of the stop sensor S1 is high or not, i.e., step 207, is repeatedly performed.

The low output state of the stop sensor S1 and the low output state of the cassette-in sensor S2 denote that the current position of the deck is not between the playback mode and stop mode but between the eject mode and unloading stop mode. Accordingly, the second step (item (ii) above, corresponding to the case between the unloading stop mode and eject mode) is executed. Thus, the mode is shifted into the stop mode and then returned to the unloading stop mode. Then, the mode reset function of the deck is stopped to maintain the unloading stop mode state and wait for the follow-up operations.

On the other hand, if the number of the FG signals counted in step 222 is determined to be greater than the reference number 1 FG, the deck is currently positioned between the unloading stop mode and stop mode.

iv) Between Unloading Stop and Stop Modes

Therefore, the second direction starting-control signal is supplied to the main servo IC 103 at step 224 to rotate the capstan motor 105 in the second direction during step 225. While the capstan motor 105 is rotated, step 226 determines whether the output of the stop sensor S1 is triggered from low to high. At the moment the output of the stop sensor S1 is triggered from the low to high, the stop control signal STOP CTL is supplied to the main servo IC 103 to stop the capstan motor 105, so that the mode reset function of the deck is stopped and placed in standby mode of operation.

In the mode reset method of the magnetic recording/reproducing apparatus according to the present invention as described above, FG signals generated in response rotation of a capstan motor and the outputs of a stop sensor S1 and a cassette-in sensor S2 are utilized when turning on the power to reset the deck to a stop mode when the deck is positioned in the stop mode, between the stop mode and a playback mode, and between the stop mode and an unloading stop mode when power is reapplied; otherwise, the deck is reset to the unloading stop mode, i.e. , when it is positioned between the unloading stop mode and eject mode. As a result, the deck can recognize its own operating mode to thereby prevent malfunction thereof when the power is turned on.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A mode reset method for a magnetic recording/reproducing apparatus including a deck and having a mode determination function executed in conjunction with output signals from a stop sensor and a cassette-in sensor, said mode reset method comprising the steps of:

(a) driving a plunger to an extended position when power is supplied to the magnetic recording/reproducing apparatus, to enable a transmission gear to connect a tape loading and running system;

(b) rotating a capstan motor to generate a rotational force to transmit the generated rotational force to said tape loading and running system;

(c) retracting said plunger to disconnect the transmission gear from the tape loading and running system and stopping the rotation of the capstan motor;

(d) determining a current position of a ring gear based on the output signals from the stop sensor and the cassette-in sensor and frequency generator signals generated responsive to rotation of said capstan motor;

(e) determining whether the magnetic recording/reproducing apparatus is in a predetermined mode based on the signals in step (d); and (f) resetting the deck to the predetermined mode, if it is determined in step (e) that the magnetic recording/reproducing apparatus is not in the predetermined mode.

2. The mode reset method of a magnetic recording/reproducing apparatus as claimed in claim 1, wherein said step (d) comprises determining said current position corresponding to said stop mode in response to a high output signal from said stop sensor when said power is applied.

3. The mode reset method of a magnetic recording/reproducing apparatus as claimed in claim 1, wherein said step (d) comprises the steps of:

(g) rotating said capstan motor in a second direction until the output from said stop sensor goes to high, when the output from said stop sensor is low and the output of said cassette-in sensor is low at the time of supplying said power;

(h) rotating said capstan motor in a first direction until the output from said stop sensor changes from high to low;

(i) counting the number of frequency generator signals corresponding to an angle between a stop mode and an unloading stop mode; and (j) stopping the rotation of said capstan motor when the counted frequency generator signals is equal to a predetermined number of frequency generator signals corresponding to said angle between said stop mode and said unloading stop mode.

4. The mode reset method of a magnetic recording/reproducing apparatus as claimed in claim 3, wherein said first direction is opposite to said second direction.

5. The mode reset method of a magnetic recording/reproducing apparatus as claimed in claim 1, wherein said step (d) comprises:

(g) counting said frequency generator signals while rotating said capstan motor in a first direction, when the output from said stop sensor is low and the output from said cassette-in sensor is high at the time of supplying said power; and (h) stopping rotation of said capstan motor when the output from said stop sensor goes high while a number indicative of respective counted frequency generator signals is less than or equal to a predetermined number of frequency generator signals corresponding to an angle between said stop mode and a playback mode.

6. The mode reset method of a magnetic recording/reproducing apparatus as claimed in claim 5, wherein said first direction is opposite to a second direction.

7. The mode reset method of a magnetic recording/reproducing apparatus as claimed in claim 1, wherein said step (d) comprises the steps of:

(g) counting frequency generator signals while rotating said capstan motor in a first direction, when the output from said stop sensor is low and the output from said cassette-in sensor is high at the time of supplying said power;

(h) rotating said capstan motor in a second direction until the output from said stop sensor is triggered from low to high when the counted frequency generator signals exceeds a predetermined number of frequency generator signals corresponding to an angle between a stop mode and a playback mode; and (i) stopping the rotation of said capstan motor at the moment the output from said stop sensor is triggered from low to high.

8. The mode reset method of a magnetic recording/reproducing apparatus as claimed in claim 7, wherein said first direction is opposite to said second direction.

9. The mode reset method of a magnetic recording/reproducing apparatus as claimed in claim 1, wherein said step (d) comprises the steps of:

(g) resetting said deck to said stop mode when said ring gear is positioned in said stop mode, between said stop mode and a playback mode, and between said stop mode and an unloading stop mode at the time of supplying said power; and (h) resetting said deck to said unloading stop mode when said ring gear is positioned between said unloading stop mode and an eject mode at the time of supplying said power.

10. A mode detecting method for a magnetic recording/reproducing system including a deck and computer having a mode determination function executed in conjunction with respective first and second output signals from a stop sensor and a cassette-in sensor, and pulse signals generated responsive to rotation of a capstan motor, said mode detecting method comprising the steps of:

(a) rotating a capstan motor to thereby initialize the system when power is applied thereto;

(b) detecting a stop mode of operation only when said first output signal corresponds to a predetermined output level; and (c) detecting one of an eject mode of operation, an unloading mode of operation, and a playback mode of operation responsive to said first output signal, said second output signal and said pulse signals.

11. The mode detecting method of a magnetic recording/reproducing system as claimed in claim 10, wherein a predetermined number of said pulse signals corresponds to an angle of rotation of said capstan motor, and wherein said method further comprises the step of counting said pulse signals for use in detecting said one of the respective modes of operation.

12. A mode detection system for a magnetic recording/reproducing apparatus, comprising:

a stop sensor generating a first output signal;

a cassette-in sensor generating a second output signal;

a frequency generator generating pulse signals responsive to rotation of a capstan motor;

a microcomputer receiving said first output signal, said second output signal and said pulse signals for controlling said capstan motor and for determining a first operating mode or one of a plurality of second operating modes, wherein the first operating mode is detected when said first output signal has a predetermined level, irrespective of said second output signal and said pulse signals, and wherein one of the plurality of second operating modes is detected responsive to said first output signal, said second output signal and said pulse signals.

* * * * *